United States Patent [19]
Cheong et al.

[11] Patent Number: 5,932,370
[45] Date of Patent: Aug. 3, 1999

[54] GROUP OF WINDING ELECTRODES

[75] Inventors: Jin Dong Cheong; Jong Wook Lee, both of Kyungki-do; Sung Suk Chae, Chungcheungnam-do, all of Rep. of Korea

[73] Assignee: Samsung Display Devices Co., Ltd., Kyungki-do, Rep. of Korea

[21] Appl. No.: 08/872,307

[22] Filed: Jun. 10, 1997

[30] Foreign Application Priority Data

Jun. 11, 1996 [KR] Rep. of Korea ............... 96-20770

[51] Int. Cl.⁶ ..................................... H01M 6/10
[52] U.S. Cl. ................. 429/94; 429/144; 29/623.1
[58] Field of Search .............. 429/94, 144; 29/623.1

[56] References Cited

U.S. PATENT DOCUMENTS

| | | | |
|---|---|---|---|
| 4,375,501 | 3/1983 | Peled | 429/94 |
| 4,385,101 | 5/1983 | Catanzarite | 429/94 |
| 4,444,854 | 4/1984 | Hooke | 429/94 |
| 5,238,757 | 8/1993 | Suzuki et al. | 429/94 |
| 5,361,102 | 11/1994 | Spillman et al. | 429/94 |
| 5,658,683 | 8/1997 | Kageyama et al. | 429/94 |
| 5,736,270 | 4/1998 | Suzuki et al. | 429/94 |

FOREIGN PATENT DOCUMENTS

| | | |
|---|---|---|
| 197426 | 10/1986 | European Pat. Off. . |
| 859884 | 1/1961 | United Kingdom . |
| 2206990 | 1/1989 | United Kingdom . |
| WO901608 | 12/1990 | WIPO . |

*Primary Examiner*—Stephen Kalafut
*Attorney, Agent, or Firm*—Christie, Parker & Hale, LLP

[57] ABSTRACT

A cell having a separator with pores prevents short-circuiting of the anode and cathode while increasing the internal space of the cell, increasing the injection volume of electrolyte, and decreasing internal gas pressures for longer durability.

17 Claims, 4 Drawing Sheets

GROUP OF WINDING ELECTRODES

BACKGROUND OF THE INVENTION

1. Field of the Invention

The present invention relates to a group of winding electrodes, and more particularly, to a novel separator with high durability and capacity, and low internal pressure for use in a cylindrical cell or a condenser.

2. Description of the Related Art

A group of winding electrodes, such as a cylindrical cell or a condenser, has a separator to prevent a short-circuit between the cathode and the anode. The present invention relates to a technology for a group of winding electrodes having a cathode, anode and separator. A cylindrical cell, especially a cylindrical nickel-hydrogen cell, is described as an example.

More and more portable electronic devices, such as a camera, a camcorder, a portable CDP, a radio, a cassette, a notebook computer, a pager and a cellular phone, etc., require a cell having higher capacity and longer durability.

In general, a cell is a device that converts chemical energy into electric energy by means of contact potential difference and many kinds of such cells are conventionally known to those skilled in the art. Electrochemical cells and batteries are technologically identified as nonchargeable primary cells, rechargeable secondary cells, fuel cells that convert combustion heat into electric energy or solar cells that convert light energy into electric energy. Electrochemical cells and batteries are classified by the composition of electrolyte and the shape of the cells and batteries. The composition of electrolyte is alkaline, solid or nonaqueous cells and the shape is cylindrical, button or coin type.

In these kinds of cells, a cylindrical cell (jelly-roll type) discharges current and is composed of a cathode, an anode, a separator to prevent a short-circuit between the cathode and the anode, an electrolyte, a positive terminal, and a negative terminal. The structure of a nickel-hydrogen cell is illustrated in FIG. 8. The cylindrical nickel-hydrogen cell is composed of a cathode (13) coated with $Ni(OH)_2$ as a positive active material, an anode (15) of hydrogenated alloy coated with a negative active material which is mainly composed of $LaNi_5$, $MmNi_5$, Ti—Fe or Ti—Ni alloy, a separator (17) which is made of a nonwoven fabric and a cellophane tape to prevent a short-circuit between the cathode (13) and the anode (15), a cap (19) as a positive terminal, a case (12) as a negative terminal a gasket (21), a safety vent (23), a cover plate (25), an insulating ring (27), and an insulating plate (29).

The process for fabricating a cylindrical nickel-hydrogen cell is as follows. First, the cathode is manufactured by coating a slurry positive active material on a metallic support and then drying and rolling the coated metallic support. The anode is manufactured by coating a slurry negative active material on a metallic support and then drying and rolling the coated metallic support. After that, a separator is laid between the cathode and the anode, and is wound. The wound assembly comprising the electrodes and separator is inserted into the can. After that, an electrolyte is poured into the can and a cap assembly is mounted in the mouth of the upper part.

A detailed description of the charge and the discharge reaction of the cylindrical nickel-hydrogen cell manufactured according to the above method is as follows.

A hydrogenated alloy is used as a negative active material, nickel hydroxide is used as a positive active material and potassium hydroxide (KOH) aqueous solution is used as an electrolyte. The hydrogenated alloy stores hydrogen ions produced by cleavage of water in the electrolyte during the charging process, and releases hydrogen ions into the electrolyte during the discharging process. The charge and discharge reactions are as follows.

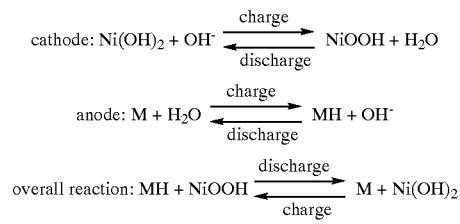

In the above reactions, M is a hydrogenated alloy that can absorb and emit hydrogen ions, identified as an $AB_5$ group that is made of rare earth elements or an $AB_2$ group that is made of Ti, Zr, V, etc. According to the above reaction, a cell performs a charge and discharge more than hundreds of times.

In the process for fabricating the cylindrical nickel-hydrogen cell with the above function and structure, as shown in FIG. 1, a cathode (13) and an anode (15) are placed on the opposite sides of a separator (17) to wind by using a mandrel around the center of the winding axis (11). But the separator, used to prevent a short-circuit between the cathode and the anode, takes up a lot of space in the can, and decreases the internal space in the cell for the injection of electrolyte and, therefore, reduces the capacity of cell. In addition, when the cathode (13), the anode (15) and the separator (17) are wound in the above way, the separator can rip, thus allowing the cathode and anode to short.

As shown FIG. 2, a technique of using an additional separator (31) covering the initial part of the cathode (13) to the initial part of the anode (15) is developed to prevent short-circuiting due to cracking of the separator (17). Although short-circuiting may be prevented, the additional separator (31) reduces the capacity of the cell because of the additional space it occupies.

As shown FIG. 3, an alternative approach is known wherein an additional separator (41) is positioned to cover from the winding axis to the initial part of the cathode (13). This approach solves the problem of decreased capacity of a cell, however, this approach still has the problem that the capacity of a cell is not increased that much because of the limits in decreasing the volume of separator.

The foregoing defect occurs in all kinds of groups of winding electrodes including a cylindrical cell and a cylindrical condenser as well as the foregoing cylindrical nickel-hydrogen cell.

SUMMARY OF THE INVENTION

To overcome the problems of the conventional arts, an object of the present invention is to provide a group of winding electrodes comprising a cathode, a positive terminal linked to the cathode, an anode, a negative terminal linked to the anode, a separator placed in between the cathode and anode, and an electrolyte characterized in that the separator has a plurality of pores in the region which is not overlapped by the cathode or anode.

Preferably, the group of winding electrodes further comprises an additional separator on one side of the separator.

Preferably, the additional separator extends from the initial part of the cathode to the initial part of the anode. Preferably, the additional separator has a plurality of pores in the region which is not overlapped by the cathode or the anode.

Preferably, the additional separator extends from the initial part of the cathode to the winding axis. Preferably, the additional separator has a plurality of pores in the region which is not overlapped by the cathode or anode.

Preferably, the pore is one or more shapes, including a circle, a triangle, a square, a hexagon and an octagon.

Preferably, the group of winding electrodes is a cylindrical cell or a cylindrical condenser.

Alternatively, the group of winding electrodes is preferably a cylindrical nickel-hydrogen cell.

Additional objects, advantages and novel features of the invention will be set forth in part in the description which follows, and in part will become apparent to those skilled in the art upon examination of the following and may be learned by practice of the invention. The object and advantages of the invention may be realized and attained by means of the instrumentalities and combinations particularly pointed out in the appended claims.

BRIEF DESCRIPTION OF THE DRAWING In the drawing.

Figure 1:
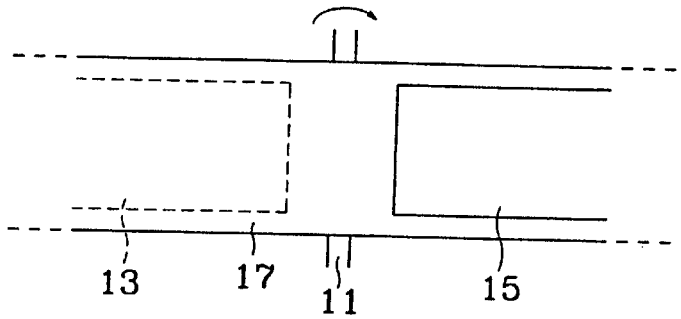
FIG. 1 is a schematic diagram showing a conventional cathode, anode and parts of a separator before winding.

In the following detailed description, only the preferred embodiment of the invention has been shown and described, simply by way of illustration of the best mode contemplated by the inventor(s) of carrying out the invention. As will be realized, the invention is capable of modification in various alternative respects, all without departing from the invention. Accordingly, the drawing and description are to be regarded as illustrative in nature, and not as restrictive.

DETAILED DESCRIPTION OF THE INVENTION

EXAMPLE 1

Figure 4:
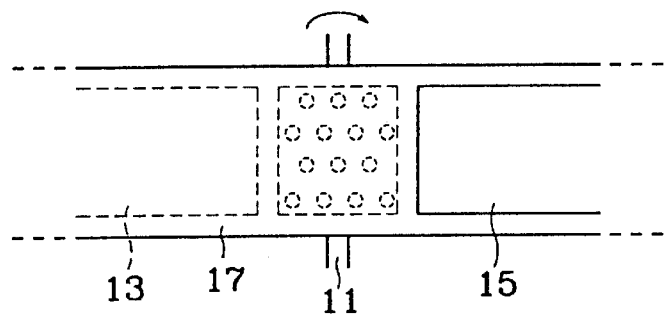
FIG. 4 is a schematic diagram showing a cathode, an anode and parts of a separator before winding according to a first embodiment of the present invention.

As shown in FIG. 4, a cathode (13) having a size of 114×35×0.73 mm and an anode (15) having a size of 149×35×0.40 mm were arranged on opposing sides of a separator (17) having a size of 263×38×0.15 mm and centered around the winding axis (11). A plurality of pores having a radius of 1 mm were established in a region of the separator that is not overlapped by the cathode and the anode. The cathode (13), the anode (15) and the separator (17) were wounded around the center of the winding axis and inserted into a can. Electrolyte injection, assembling and formation were performed to is fabricate a cell.

EXAMPLE 2

Figure 5:
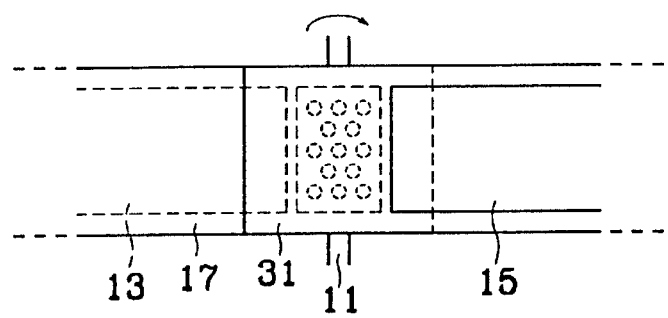
FIG. 5 is a schematic diagram showing a cathode, an anode, parts of a separator and additional separator before winding according to a second embodiment of the present invention.

As shown in FIG. 5, a cathode (13) having a size of 114×35×0.73 mm and an anode (15) having a size of 149×35×0.40 mm were arranged on opposing sides of a separator (17) having a size of 263×38×0.15 mm and centered around the winding axis (11). An additional separator (31) having a size of 40×38×0.15 mm, enough to cover the initial parts of the cathode (13) and the anode (15), was placed on one side of the separator (17) with the cathode (13). A plurality of pores having a radius of 1 mm were established in a region of the separator (17) and the additional separator (31) that is not overlapped by the cathode (13) and the anode (15). After winding the cathode (13), the anode (15), the separator (17) and the additional separator (31) around the winding axis (11), the wound assembly was inserted into a can. Electrolyte injection, assembling and formation were performed to fabricate a cell.

EXAMPLE 3

Figure 6:
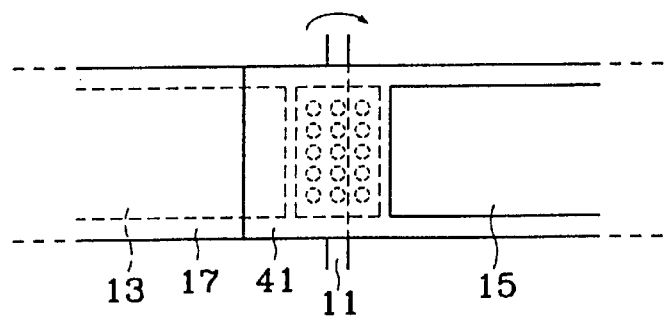
FIG. 6 is a schematic diagram showing a cathode, an anode, parts of a separator and additional separator before winding according to a third embodiment of the present invention.
Figure 7A:
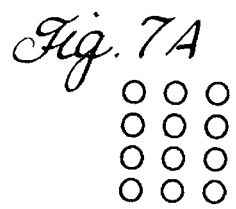
FIG. 7 is an illustration of the many shapes, numbers, and placing of pores in a separator of the present invention.
Figure 7B:
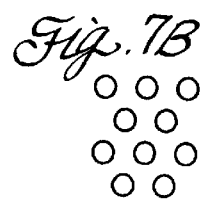
Figure 7C:
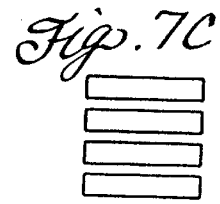
Figure 7D:
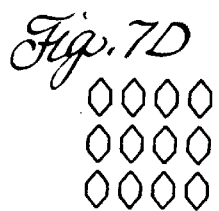
Figure 7E:
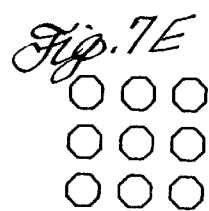
Figure 7F:
Figure 7G:
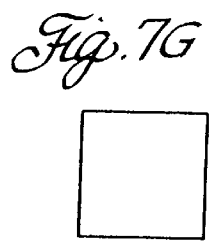
Figure 7H:
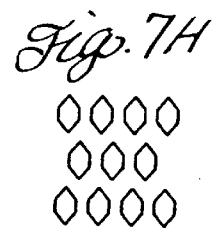
Figure 7I:
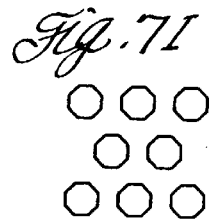
Figure 7J:
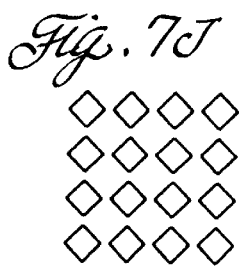
Figure 7K:
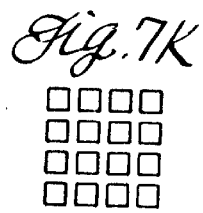
Figure 7L:
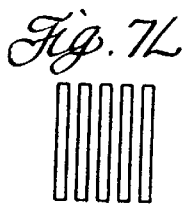
Figure 7M:
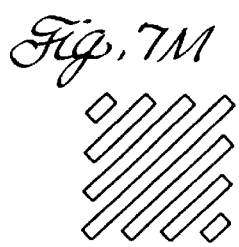
Figure 8:
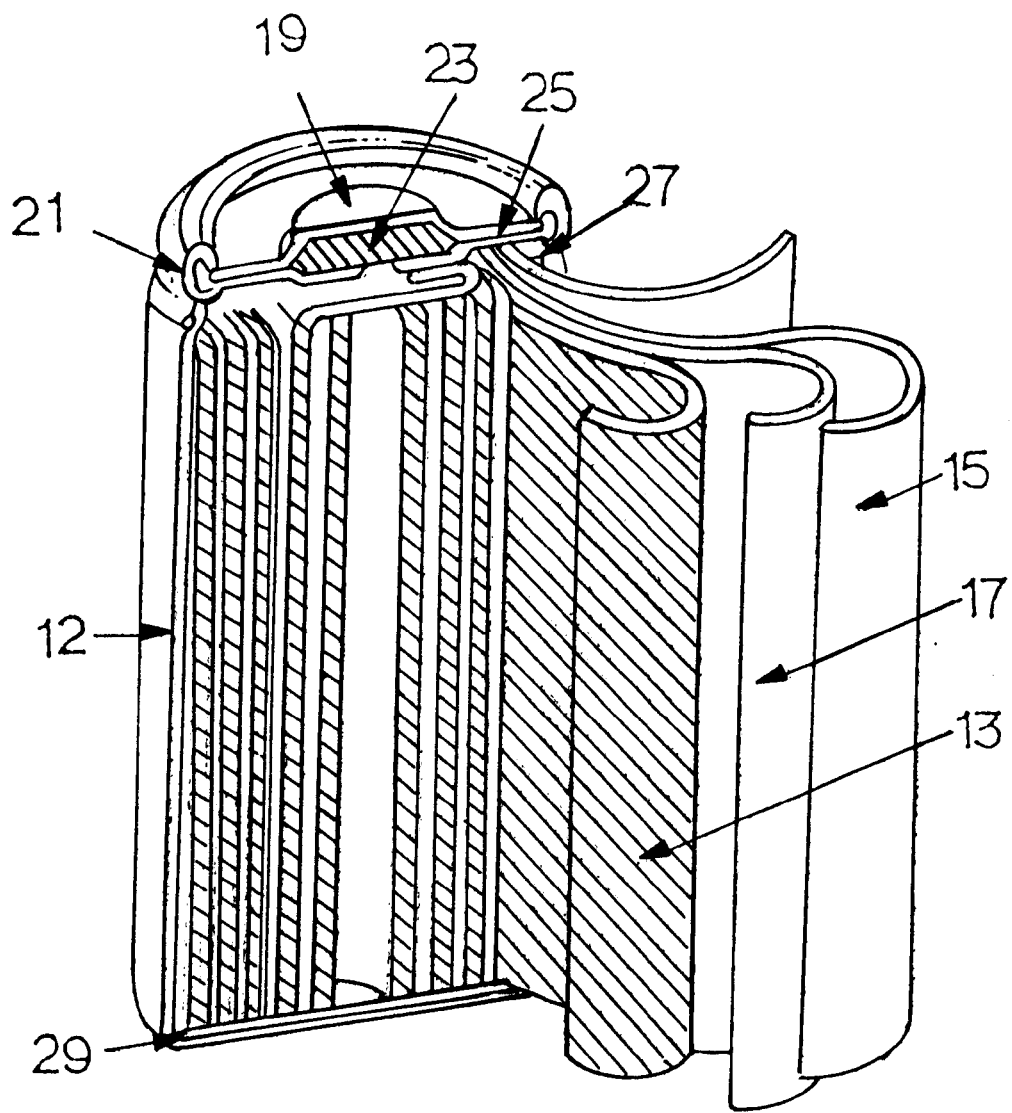
FIG. 8 is an illustration of a structure of a cylindrical cell.

As shown in FIG. 6, a cathode (13) having a size of 114×35×0.73 mm and an anode (15) having a size of 149×35×0.40 mm were arranged on opposing sides of a separator (17) having a size of 263×38×0.15 mm and centered around the winding axis (11). An additional separator (41) having a size of 26×38×0.15 mm, enough to cover from the initial part of the cathode (13) to the winding axis (11), was placed on one side of separator (17) with the cathode (13). A plurality of pores having a radius of 1 mm were established in a region of the separator (17) and the additional separator (41) that is not overlapped by the cathode (13) and the anode (15). After winding the cathode (13), the anode (15), the separator (17) and the additional separator (41) around the winding axis (11), the wound assembly was inserted into a can. Electrolyte injection, assembling and formation were performed to fabricate a cell.

COMPARATIVE EXAMPLE 1

As shown in FIG. 1, a cathode (13) having a size of 114×35×0.73 mm and an anode (15) having a size of 149×35×0.40 mm were arranged on opposing sides of a separator (17) having a size of 263×38×0.15 mm and centered around the winding axis (11). After winding the cathode (13), the anode (15) and the separator (17) around the winding axis (11), the wound assembly was inserted into a can. Electrolyte injection, assembling and formation were performed to fabricate a cell.

COMPARATIVE EXAMPLE 2

Figure 2:
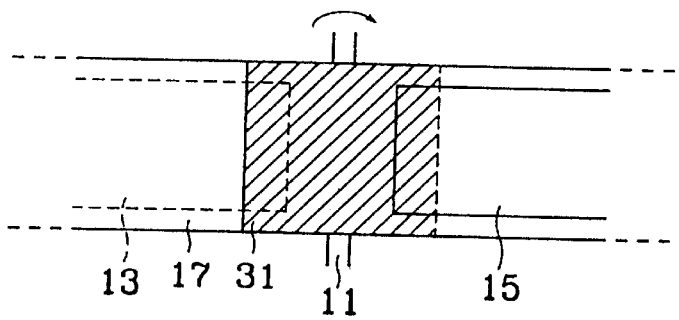
FIG. 2 is an another schematic diagram showing a conventional cathode, anode, parts of a separator and additional separator before winding.

As shown in FIG. 2, a cathode (13) having a size of 114×35×0.73 mm and an anode (15) having a size of 149×35×0.40 mm were arranged on opposing sides of a separator (17) having a size of 263×38×0.15 mm and centered around the winding axis (11). An additional separator (31) having a size of 40×38×0.15 mm, enough to cover from the initial parts of the cathode (13) and the anode (15), was placed on one side of the separator (17) with cathode (13). After winding the cathode (13), the anode (15), the separator (17) and the additional separator (31) around the winding axis (11), the wound assembly was inserted into a can. Electrolyte injection, assembling and formation were performed to fabricate a cell.

COMPARATIVE EXAMPLE 3

Figure 3:
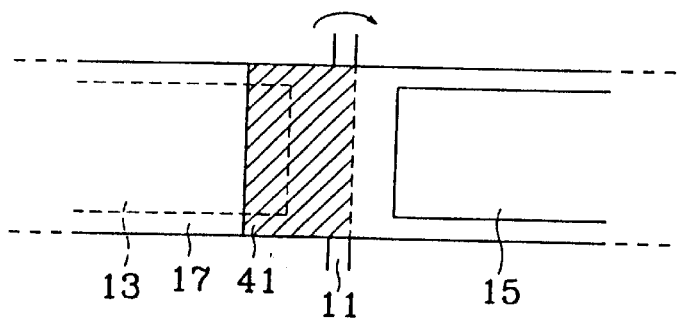
FIG. 3 is the third schematic diagram showing a conventional cathode, anode, parts of a separator and additional separator before winding.

As shown in FIG. 3, a cathode (13) having a size of 114×35×0.73 mm and an anode (15) having a size of 149×35×0.40 mm were arranged on opposing sides of a separator (17) having a size of 263×38×0.15 mm and centered around the winding axis (11). An additional separator (41) having a size of 26×38×0.15 mm, enough to cover from the initial parts of the cathode (13) to the winding axis (11), was placed on one side of the separator (17) with the cathode (13). After winding the cathode (13), the anode (15), the separator (17) and the additional separator (41) around the winding axis (11), the wound assembly was inserted into a can. Electrolyte injection, assembling and formation were performed to fabricate a cell.

The following table shows the results of measuring the volume decrease of a separator, injection volume of an electrolyte, internal pressure, and durability according to the above examples and comparative examples.

(TABLE)

| | Volume (mm³) | Injection volume of an electrolyte (g) | Internal pressure (Kg/cm²) | Durability (cycle) |
|---|---|---|---|---|
| Example 1 | 1470 | 3.4 | 10 | 350 |
| Example 2 | 1665 | 3.4 | 10 | 350 |
| Example 3 | 1601 | 3.4 | 10 | 350 |
| Comparative Example 1 | 1500 | 3.2 | 10 | 300 |
| comparative Example 2 | 1727 | 3.2 | 10 | 300 |
| Comparative Example 3 | 1647 | 3.2 | 10 | 300 |

As shown in the above table, the volume of the cell with a separator having pores according to examples of the present invention is decreased by a maximum of 7% in comparison with a cell with a separator having no pores according to the comparative examples. Therefore, the internal space of the cell is increased by a maximum of 33% on the basis of the injection volume of the electrolyte. The larger internal space prevents increasing of internal pressure of produced gas.

As shown above, the quality of the cell having a separator with pores according to the present invention is excellent because of the increased internal space, increased injection volume of an electrolyte, lower internal gas pressure and much higher durability than that of a conventional cell.

As shown FIG. 7, a separator according to the present invention can have pores of one or more various shapes and placement methods. The various shapes of pores are: a circle, a triangle, a square, a hexagon, and an octagon, etc.

As shown above, a separator having pores according to the present invention prevents a short-circuit, increases the internal space of the cell, increases the injection volume of an electrolyte and decreases internal gas pressure to have longer durability. The effect of the present invention on a group of winding electrodes is not limited to the cylindrical nickel-hydrogen cell but also can be applied to a cylindrical cell or condenser with the same structure as the cylindrical nickel-hydrogen cell.

In this disclosure, there is shown and described only the preferred embodiment of the invention, but, as aforementioned, it is to be understood that the invention is capable of use in various other combination and environments and is capable of changes or modification within the scope of the inventive concepts as expressed herein.

What is claimed is:

1. A winding electrode assembly, comprising:
    a cathode winding electrode;
    a positive terminal linked to said cathode winding electrode;
    an anode winding electrode;
    a negative terminal linked to said anode winding electrode; and
    a separator having two sides and a central portion extending between opposing central portion ends, said cathode winding electrode being arranged on one of the two sides of the separator and extending from one of the opposing ends of the central portion in a direction away from said central portion, and said anode winding electrode being arranged on the other one of the two sides of the separator and extending from the other one of the opposing ends of the central portion in a direction away from the central portion, said separator having a plurality of holes in the central portion.

2. The winding electrode assembly of claim 1 further comprising an additional separator on one side of said separator.

3. The winding electrode assembly of claim 2 wherein said additional separator extends from an initial part of said cathode winding electrode to an initial part of said anode winding electrode.

4. The winding electrode assembly of claim 2 wherein said additional separator extends from an initial part of said cathode winding electrode to a winding axis of said winding electrodes.

5. The winding electrode assembly of claim 3 wherein said additional separator has a plurality of pores in a region not overlapped by said cathode and said anode winding electrodes.

6. The winding electrode assembly of claim 4 wherein said additional separator has a plurality of pores in a region not overlapped by said cathode and said anode winding electrodes.

7. The winding electrode assembly of claim 1 wherein each one of said pores has a shape selected from the group consisting of a circle, a triangle, a square, a hexagon and an octagon.

8. The winding electrode assembly of claim 1 wherein said winding electrodes is a cylindrical cell or a cylindrical condenser.

9. The winding electrode assembly of claim 1 wherein said winding electrodes is a cylindrical nickel-hydrogen cell.

10. The winding electrode assembly of claim 1 wherein the cathode winding electrode, the anode winding electrode, and the separator are wound together.

11. A winding electrode assembly, comprising:
    a cathode winding electrode;
    an anode winding electrode; and
    a separator having two sides and a central portion extending between opposing central portion ends, said cathode winding electrode being arranged on one of the two sides of the separator and extending from one of the opposing ends of the central portion in a direction away from said central portion, and said anode winding electrode being arranged on the other one of the two sides of the separator and extending from the other one of the opposing ends of the central portion in a direction away from the central portion, said separator having a plurality of holes in the central portion.

12. The winding electrode assembly of claim 11 further comprising a positive terminal linked to said cathode winding electrode and a negative terminal linked to said anode winding electrode.

13. The winding electrode assembly of claim 11 wherein the cathode winding electrode, the anode winding electrode, and the separator are wound together.

14. The winding electrode assembly of claim 13 further comprising a can, and said wound cathode winding electrode, anode winding electrode, and separator disposed in said can.

15. The winding electrode assembly of claim 14 further comprising an electrolyte disposed in said can.

16. A process for winding an electrode assembly having a separator with two sides and a central portion extending between opposing central portion ends, the process comprising the steps of:

forming a plurality of holes in the central portion of the separator;

arranging a cathode on one of the two sides of the separator such that the cathode extends from one of the opposing ends of the central portion in a direction away from the central portion;

arranging an anode on the other one of the two sides of the separator such that the anode extends from the other one of the opposing ends of the central portion in a direction away from the central portion; and winding the separator about a central axis thereof.

17. A process for fabricating a cell having a separator with two sides and a central portion extending between opposing central portion ends, the process comprising the steps of:

forming a plurality of holes in the central portion of the separator;

arranging a cathode on one of the two sides of the separator such that the cathode extends from one of the opposing ends of the central portion in a direction away from the central portion;

arranging an anode on the other one of the two sides of the separator such that the anode extends from the other one of the opposing ends of the central portion in a direction away from the central portion; and winding the separator about a central axis thereof to form a wound assembly;

inserting the wound assembly into a can; and injecting electrolyte into the can.

* * * * *